United States Patent [19]
Carpenter

[11] 3,967,033
[45] June 29, 1976

[54] FIRE-RETARDANT PANEL CONSTRUCTION

[75] Inventor: Robert E. Carpenter, Worthington, Ohio

[73] Assignee: Ashland Oil, Inc., Ashland, Ky.

[22] Filed: Dec. 22, 1975

[21] Appl. No.: 643,517

[52] U.S. Cl. ............................. 428/307; 428/310; 428/313; 428/315; 428/322
[51] Int. Cl.² ............................................ B32B 3/26
[58] Field of Search ........... 428/307, 313, 310, 315, 428/321, 322, 920, 921

[56] References Cited
UNITED STATES PATENTS

| | | | |
|---|---|---|---|
| 3,666,697 | 5/1972 | Peloza | 260/22 R |
| 3,718,532 | 2/1973 | Hayes, Jr. | 428/307 |
| 3,816,234 | 6/1974 | Winfield | 428/322 |

*Primary Examiner*—William J. Van Balen

[57] ABSTRACT

A fire resistant structural panel is provided in form of a sandwich assembly having outer metallic skin surfaces and a core section composed of a thermal barrier layer adjoining at least one side of a layer of a foamed polymeric insulating material, said thermal barrier being a thermoset resinous composition containing homogeneously dispersed colloidal size droplets of water.

6 Claims, No Drawings

FIRE-RETARDANT PANEL CONSTRUCTION

BACKGROUND OF THE INVENTION

1. Field of the Invention

This invention relates to fire resistant, insulating panels useful as wall members in the construction of buildings and the like structures.

2. Description of the Prior Art

The building industry has recently been witnessing an ever increasing use of insulating structural panels as wall members in the construction of buildings. A conventional structural panel for this purpose consists of outer metallic skin surfaces bonded to a three or four inch core of a foamed polymeric material such as polystyrene or polyurethane. To date, essentially all of the panels of the foregoing type have been used in the construction of preengineered commercial buildings. Lately, however, considerable interest has been evidenced by the industry in constructing office bulidings, multi-family buildings such as apartment complexes, and even low cost single residence structures, in which the panels would serve as wall members. These contemplated uses of panel construction, however, call for fire resistancy which the conventional panels sorely lack. As a matter of fact, a national code is now being formulated which will serve to specify the degree of fire resistance the panel must exhibit depending upon the nature of the building, that is, whether it will be used for residential purposes or otherwise. A further discussion of this proposed code will be given hereinafter inasmuch as it relates importantly to the salient objective of the present invention.

Accordingly, there is an emerging industry need for a structural panel construction which will conform to certain mandated fire resistance properties. But at the same time such construction must not increase the cost of constructing the panel intolerably or materially add to its weight as presently designed. And above all, such construction must not involve an assembly procedure incompatible with the production methods now practiced in manufacturing conventional panels. It is therefore the object of this invention to provide structural panels meeting the foregoing desiderata.

SUMMARY OF THE INVENTION

In accordance with the present invention a structural panel is provided which is designed for use as a fire-resistant, insulating wall members in the construction of buildings. The panel comprises an integrated sandwich arrangement having outer planar metallic skin surfaces and a laterally coextensive inner core assembly. The latter assembly is that of an insulating layer of a foam polymeric material either or both sides of which adjoins a comparatively thin layer of a thermal barrier. The thermal barrier layer in turn is a solid water-in-oil emulsion wherein the continuous phase is a thermoset polymerization product of an unsaturated linear polyester and a vinyl monomer crosslinking agent.

DESCRIPTION OF THE PREFERRED EMBODIMENTS

As mentioned hereinabove, the practice of the present invention provides for a building panel construction designed to meet the requirements stipulated in a proposed national code for fire resistant products of this type. The proposed requirements are set forth in a testing procedure currently designated ASTM E-119. While the foregoing test method contemplates a number of performance ratings, only two are of particular concern at this time. The more limited version thereof is the so-called "15-minute finish rating" which involves exposure of the one surface of a test panel to a controlled temperature gradient of from 1000° to 1300° F. over 15 minutes. The other performance standard, referred to as "1-hour rating," calls for exposing one face or surface of the panel of a controlled temperature gradient of from 1000° to 1700° F. over 60 minutes.

In both versions of the performance testing, certain temperature rise limits are specified. In the lower performance test, the temperature of the surface of the insulating layer in closest proximity to the exposed panel surface can not exceed 250° F. above the initial temperature (average of 4 thermocouples) within the stated period and no one temperature can exceed 370+ F. above initial temperature. In the higher performance test, the specified heat temperature rise limit is the same, but measured on the unexposed outer surface of the test panel. The "15-minute finish rating" applies to those panels which are designed to be used in the construction of pre-engineered buildings. Presumably the thought here is that the indicated time before the insulating material rises to combustion temperature will allow ample time for any occupants to vacate the building. The "1-hour rating" performance requirement is applicable to the construction of residential buildings including business offices, where any fire that arises will be confined to the site of origin, at least for the length of time afforded by conventional dry-wall or plaster/lath construction.

As can be appreciated from the foregoing discussion, what is called for in limiting the heat rise in the contemplated panels is a layer or layers of a material which will serve as the thermal barier in form of a heat sink. Solid water-in-oil emulsions wherein the continuous phase is a thermoset polyester resinous composition have been found to be excellent heat sinks for the purpose of meeting both performance ratings of ASTM E-119. The polyester resinous compositions useful for preparing said heat sink layer(s) are commercially available from a number of sources. Basically, the polyester component of such compositions is a polyesterification product obtained by condensing a dihydric alcohol with a dicarboxylic acid employing as all or part of the latter component, an $\alpha$, $\beta$-ethylenically unsaturated diacid. The polyesterification product as aforedescribed is combined or rather dissolved in a vinyl monomer crosslinking agent, typically styrene, to provide the thermosetting resinous composition suitable for preparing the solid water-in-oil emulsions referred to above. A detailed description of the manner in which the aforedescribed thermosetting polyester resinous composition can be made is set forth in U.S. Pat. 3,666,697. Likewise, this patent describes the preparation of a thermoset water-in-oil emulsion from a representative polyester resinous composition useful in the practice of this invention. Applicable cured water-in-oil compositions for use in accordance with the present invention can be prepared containing from 30 to 70 weight % colloidally dispersed water. From the standpoint of optimum structural strength properties coupled with economy considerations, the preferred thermal barriers are those thermoset products containing from 50 to 60 weight % water.

The thickness of the thermal barrier layer needed for achieving the performance ratings of ASTM E-119 largely depends upon the water content thereof. With respect to the preferred solid emulsions; i.e., those containing from 50 to 60 weight % water, a layer thickness in the order of ¼ inch will suffice for realizing each of the performance specifications. Where a thermal barrier layer of the aforementioned thickness is interposed between the insulation layer and a metallic skin surface the assembly will readily pass the "15-minute finish rating" when the surface of the metal skin element adjoining the thermal barrier is subjected to the flame exposure. In designing panels for the high performance rating, two ¼ inch layers of the thermal barrier are called for, each interposed between the metallic skin coverings and the insulation layer.

The ASTM E-119 testing procedure for both ratings calls for exposing an overall area of 10 ft. by 10 ft. to the indicated temperatures. As a practical matter such an exposure will involve the use of at least two panels thus providing a potentially failure prone area along the seam where the panels are butted together. In the lower performance test, no failures were experienced along the seam or joint when utilizing the panel construction of this invention. Surprisingly, the seam area likewise withstood failure when subjected to the high performance test in limited evaluations using the preferred thermal barriers. If, however, failure in such areas is of concern or is contributed to by the particular thermal barrier employed such can be completely obviated by proper joint construction which is beyond the purview of the present invention but within the skill of the relevant art.

The thickness of the layer of insulating material depends almost entirely upon the degree of heat loss that can be tolerated under the building design conditions appertaining. Of the commonly used insulating materials; viz., foamed polystyrene and foamed polyurethane, the latter is preferred in the practice of this invention. This preference primarily turns on the ease with which such type of insulating panels can be fabricated and the superior insulation value of foamed polyurethane. A preferred procedure for preparing the latter type of panel consists of applying a suitable adhesive, e.g., epoxy, acrylic or the like adhesive, to one side of a metallic skin element and thereupon forming a layer of the thermosetting water-in-oil emulsion and then effecting the cure thereof, followed by foaming in place the polyurethane in a void existing between the other skin cover and the cured thermal barrier. This procedure can, of course, be modified appropriately to prepare panels designed to meeting the "1-hour rating." When utilizing foamed polystyrene as the insulating material, the best procedure is to adhere a layer of preformed foamed polystyrene to the formed thermal barrier layer and the other skin surface employing a suitable adhesive to accomplish requisite bonding.

The following example is given to illustrate in detail how the present invention can be implemented to provide building panels capable of withstanding the flame exposure conditions specified in ASTM E-119 for both performance ratings to which the test method is directed.

EXAMPLE

Part A. 15 Min. Rated Panel Construction Procedure

1. An 18 ga. sheet metal skin, finished side down, is secured to a flat surface, and restrained from warping, bowing, etc.
2. A suitable adhesive, if required, is sprayed or brushed uniformly onto the skin and allowed to dry.
3. A frame is placed around the periphery of the skin having a thickness slightly greater than the desired barrier thickness (e.g. ⅜ inch for ¼ inch final barrier).
4. A liquid water-in-oil emulsion, containing a conventional catalyst and promoter system for room temperature cure, is metered onto the prepared skin to a thickness of about ¼ inch.
5. The emulsion is allowed to gel and cure. Best results are obtained when the barrier material is allowed to cool to room temperature prior to foaming. However, satisfactory results are obtained after waiting only for the barrier to pass its peak exotherm temperature. The barrier frame is removed prior to the next step.
6. An appropriately sized frame capable of providing the desired thickness of foam is placed around the periphery of the skin and barrier composite and the exterior skin set in place.
7. Mixed urethane foam components are injected into the cavity between the top skin and the thermal barrier.
8. The panel assembly is placed in a press maintaining the desired foam thickness and so confined until the exotherm subsides.

Part B. 1 Hour Rated Panel Construction Procedure

1. Steps 1 through 5 above are repeated for both skins.
2. An appropriately sized frame is placed between the skins, positioned thermal barrier in.
3. Steps 6 through 8 above are repeated.

What is claimed is:

1. A fire-resistant insulating structural panel having outer planar metallic skin surfaces and a laterally coextensive inner core assembly of a layer of foamed polymeric material of which at least one side thereof adjoins a thermal barrier layer comprising a solid water-in-oil emulsion wherein the continuous phase is a thermoset polymerization product of an unsaturated linear polyester and a vinyl monomer crosslinking agent.

2. A structural panel in accordance with claim 1 wherein said thermal barrier layer contains from about 30 to 70 weight percent water.

3. A structural panel in accordance with claim 2 wherein said thermal barrier layer contains from about 50 to 60 weight percent water.

4. A structural panel in accordance with claim 3 wherein said metallic skin surfaces are either steel or aluminum.

5. A structural panel in accordance with claim 4 wherein said polymeric material is foamed polyurethane.

6. A structural panel in accordance with claim 4 wherein said polymeric material is foamed polystyrene.

* * * * *